(12) United States Patent
Wang et al.

(10) Patent No.: US 11,409,013 B2
(45) Date of Patent: Aug. 9, 2022

(54) SYSTEM AND METHOD FOR PROPERTY ESTIMATION FROM SEISMIC DATA

(71) Applicant: Chevron U.S.A. Inc., San Ramon, CA (US)

(72) Inventors: Ke Wang, Houston, TX (US); Laura L. Bandura, Houston, TX (US); Dimitri Bevc, Houston, TX (US); James P. Disiena, Houston, TX (US); Adam Dean Halpert, Houston, TX (US); Bruce A. Power, Houston, TX (US); Ellen Xiaoxia Xu, Houston, TX (US)

(73) Assignee: Chevron U.S.A. Inc., San Ramon, CA (US)

( * ) Notice: Subject to any disclaimer, the term of this patent is extended or adjusted under 35 U.S.C. 154(b) by 86 days.

(21) Appl. No.: 16/816,041

(22) Filed: Mar. 11, 2020

(65) Prior Publication Data
US 2020/0309979 A1 Oct. 1, 2020

Related U.S. Application Data

(60) Provisional application No. 62/825,399, filed on Mar. 28, 2019.

(51) Int. Cl.
*G01V 1/30* (2006.01)
*G06N 3/04* (2006.01)
*G06N 3/08* (2006.01)

(52) U.S. Cl.
CPC .............. *G01V 1/307* (2013.01); *G06N 3/04* (2013.01); *G06N 3/08* (2013.01); *G01V 2210/612* (2013.01); *G01V 2210/6161* (2013.01)

(58) Field of Classification Search
CPC ............ G01V 1/307; G01V 2210/612; G01V 2210/6161; G06N 3/04; G06N 3/08
See application file for complete search history.

(56) References Cited

U.S. PATENT DOCUMENTS 6,957,146 B1    10/2005   Taner

FOREIGN PATENT DOCUMENTS

WO      20180827901 W     5/2018

OTHER PUBLICATIONS

Zhang et al., Time-variant wavelet extraction with a local-attribute-based time-frequency decomposition for seismic inversion:, Interpretation, vol. 5, No. 1 (Feb. 2017) (Year: 2017).*

(Continued)

*Primary Examiner* — Regis J Betsch
(74) *Attorney, Agent, or Firm* — Marie L. Clapp

(57) ABSTRACT

A method is described for property estimation including receiving a seismic dataset representative of a subsurface volume of interest and a well log from a well location within the subsurface volume of interest; identifying seismic traces in the seismic dataset that correspond to the well location to obtain a subset of seismic traces; windowing the subset of seismic traces and the well log to generate windowed seismic traces and a windowed well log; multiplying the windowed seismic traces and the windowed well log by a random matrix to generate a plurality of training datasets; and training a neural network using the plurality of training datasets. The method may be executed by a computer system.

11 Claims, 7 Drawing Sheets

(56) References Cited

OTHER PUBLICATIONS

Kim et al., "Geophysical inversion versus machine learning in inverse problems", The Leading Edge Dec. 2018 (Year: 2018).*
Liu et al. Semi-random partitioning of data into training and test sets in granular computing context, Granul. Comput. (2017) 2:357-386 (Year: 2017).*
Breiman, "Randomizing Outputs to Increase Prediction Accuracy", Machine Learning, 40, 229-242, 2000 (Year: 2000).*
Ma et al. Integration of seismic and well-log data using statistical and neural network methods, The Leading Edge • Apr. 2017 (Year: 2017).*
Dorrington, et al. "Genetic-algorithm/neural-network approach to seismic attribute selection for well-log prediction", Geophysics, vol. 69, No. 1 (Jan.-Feb. 2004); p. 212-221 (Year: 2004).*
Ursula Iturraran-Viveros et al., "Validated Artificial Neural Networks in Determining Petrophysical Properties: A Case Study from Colombia," Interpretation, Nov. 1, 2018, T1067-T1081, vol. 6, No. 4 (Year: 2018).*
Jason Brownlee, "Train Neutral Networks with Noise to Reduce Overfitting," Deep Learning Performance, Dec. 12, 2018, pp. 1-9. (Year: 2018).*
Kur Hornik et al., "Multilayer Feedforward Networks are Universal Approximators", Neural Networks, 1989, p. 359-366, vol. 2, Pergamon Press plc., Printed in the USA.
Yuji Kim et al., "Geophysical Inversion Versus Machine Learning in Inverse Problems", The Leading Edge, Dec. 2018, p. 894-901.
Vishal Das et al., "Convolutional Neural Network for Seismic Impedance Inversion", Society of Exploration Geophysicists, Nov.-Dec. 2019, Geophysics, vol. 84, No. 6, p. R869-R880.
Olaf Ronneberger et al., "U-Net: Convolutional Networks for Biomedical Image Segmentation", Computer Science Department and BIOSS Centre for Biological Signaling Studies, MICCAI 2015.
Rui Zhang et al., "Time-Variant Wavelet Extraction with a Local-Attribute-Based Time-Frequency Decomposition for Seismic Inversion", Interpretation, Feb. 2017, p. SC9-SC16, vol. 5. No. 1.
Saba Keynejad et al., "Comparison of Model-Based Generalized Regression Neural Network and Prestack Inversion in Predicting Poisson's Ratio in Heidrun Field, North Sea", the Leading Edge, Nov. 2017, Special Section: Reservoir Characterization, p. 938-946.
Daniel P. Hampson et al., "Use of Multiattribute Transforms to Predict Log Properties from Seismic Data", Society of Exploration Geophysicists, Jan.-Feb. 2001, Geophysics, vol. 66, No. 1, p. 220-236.
Li Xu et al., "Deep Convolutional Neural Network for Image Deconvolution", 2014, Project webpage: http://lxu.me/projects/dcnn/.
Atul Kumar et al., "A Model-Based Approach for Integration Analysis of Well Log and Seismic Data for Reservoir Characterization," Geosciences Journal, Jun. 2016, p. 331-350, vol. 20, No. 3, The Association of Korean Geoscience Societies and Springer 2016.
Jason Brownlee, "Train Neutral Networks with Noise to Reduce Overfitting," Deep Learning Performance, Dec. 12, 2018, pp. 1-9.
PCT International Search Report dated Jun. 19, 2020 issued in Application No. PCT/IB2020/052076, filed on Mar. 11, 2020, 5 pages.
Ursula Iturraran-Viveros et al., "Validated Artificial Neural Networks in Determining Petrophysical Properties: A Case Study from Colombia," Interpretation, Nov. 1, 2018, T1067-T1081, vol. 6, No. 4.

* cited by examiner

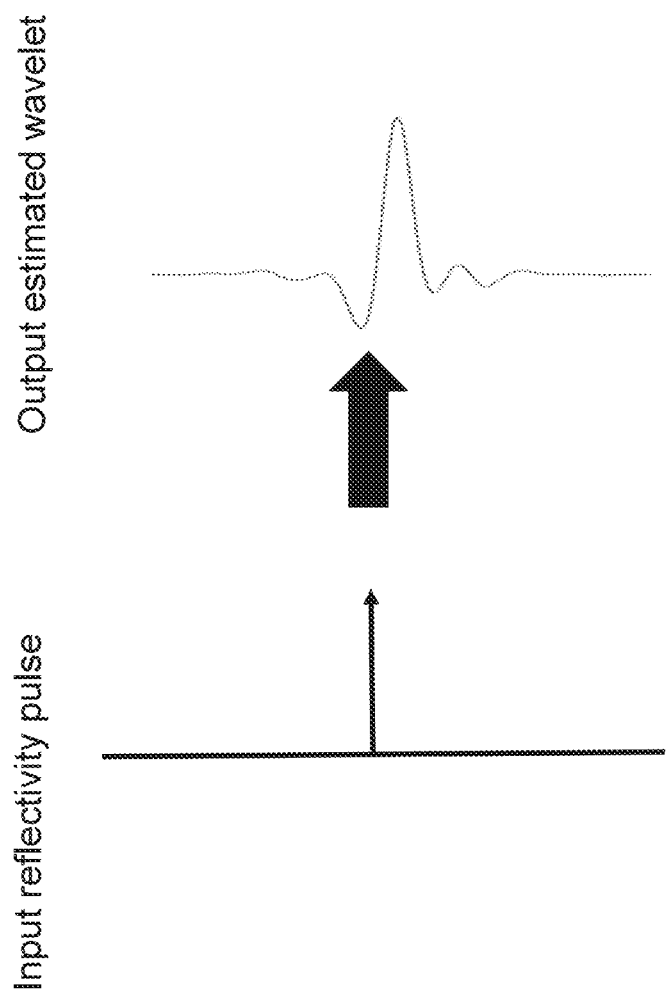

SYSTEM AND METHOD FOR PROPERTY ESTIMATION FROM SEISMIC DATA

CROSS-REFERENCE TO RELATED APPLICATIONS

This application claims the benefit of U.S. Provisional Application 62/825,399 filed Mar. 28, 2019.

STATEMENT REGARDING FEDERALLY SPONSORED RESEARCH OR DEVELOPMENT

Not applicable.

TECHNICAL FIELD

The disclosed embodiments relate generally to techniques for estimating properties in subsurface reservoirs and, in particular, to a method of estimating rock properties and seismic properties by inversion of seismic data using machine learning.

BACKGROUND

Seismic exploration involves surveying subterranean geological media for hydrocarbon deposits. A survey typically involves deploying seismic sources and seismic sensors at predetermined locations. The sources generate seismic waves, which propagate into the geological medium creating pressure changes and vibrations. Variations in physical properties of the geological medium give rise to changes in certain properties of the seismic waves, such as their direction of propagation and other properties.

Portions of the seismic waves reach the seismic sensors. Some seismic sensors are sensitive to pressure changes (e.g., hydrophones), others to particle motion (e.g., geophones), and industrial surveys may deploy one type of sensor or both. In response to the detected seismic waves, the sensors generate corresponding electrical signals, known as traces, and record them in storage media as seismic data. Seismic data will include a plurality of "shots" (individual instances of the seismic source being activated), each of which are associated with a plurality of traces recorded at the plurality of sensors.

As one of skill in the art can appreciate, seismic data contains information about subsurface geologic features including hydrocarbon deposits. Seismic inversion is a way of estimating various rock properties from the seismic data. The central task of reflection seismic inversion is to associate recorded seismic traces with change of earth properties in a quantitative way. Seismic inversion involves removing the imprints of the wavelet in the seismic data and then converting the results into acoustic and/or elastic impedance. The impedances and changes of impedance with subsurface location indicate changing rock and fluid properties. The ability to define the location of rock and fluid property changes in the subsurface is crucial to our ability to make the most appropriate choices for purchasing materials, operating safely, and successfully completing projects. Project cost is dependent upon accurate prediction of the position of physical boundaries within the Earth. Decisions include, but are not limited to, budgetary planning, obtaining mineral and lease rights, signing well commitments, permitting rig locations, designing well paths and drilling strategy, preventing subsurface integrity issues by planning proper casing and cementation strategies, and selecting and purchasing appropriate completion and production equipment.

There exists a need for improved rock property estimation between well locations in order to identify potential hydrocarbon reservoirs.

SUMMARY

In accordance with some embodiments, a method of property estimation including receiving a seismic dataset representative of a subsurface volume of interest and a well log from a well location within the subsurface volume of interest; identifying seismic traces in the seismic dataset that correspond to the well location to obtain a subset of seismic traces; windowing the subset of seismic traces and the well log to generate windowed seismic traces and a windowed well log; multiplying the windowed seismic traces and the windowed well log by a random matrix to generate a plurality of training datasets; and training a neural network using the plurality of training datasets is disclosed.

In another aspect of the present invention, to address the aforementioned problems, some embodiments provide a non-transitory computer readable storage medium storing one or more programs. The one or more programs comprise instructions, which when executed by a computer system with one or more processors and memory, cause the computer system to perform any of the methods provided herein.

In yet another aspect of the present invention, to address the aforementioned problems, some embodiments provide a computer system. The computer system includes one or more processors, memory, and one or more programs. The one or more programs are stored in memory and configured to be executed by the one or more processors. The one or more programs include an operating system and instructions that when executed by the one or more processors cause the computer system to perform any of the methods provided herein.

BRIEF DESCRIPTION OF THE DRAWINGS

FIG. 3C demonstrates steps and a result for a particular embodiment;

Like reference numerals refer to corresponding parts throughout the drawings.

DETAILED DESCRIPTION OF EMBODIMENTS

Described below are methods, systems, and computer readable storage media that provide a manner of rock property estimation.

Reference will now be made in detail to various embodiments, examples of which are illustrated in the accompanying drawings. In the following detailed description, numerous specific details are set forth in order to provide a thorough understanding of the present disclosure and the embodiments described herein. However, embodiments described herein may be practiced without these specific details. In other instances, well-known methods, procedures, components, and mechanical apparatus have not been described in detail so as not to unnecessarily obscure aspects of the embodiments.

The present invention includes embodiments of a method and system for estimating rock properties from seismic data. The central task of reflection seismic inversion is to associate recorded seismic traces with change of earth properties in a quantitative way. Seismic inversion involves removing the imprints of the wavelet in the seismic data and then converting the results into acoustic and/or elastic impedance. Wavelets act as filters that blur the earth's high frequency reflectivity into low frequency seismic traces in a seismic volume. Wavelet estimation is required by conventional seismic inversion methods. Also, recent neural network-based machine learning methods require a wavelet to generate synthetic datasets to train the neural networks. Wavelet estimation as an intermediate step to the final goal, however, poses efficiency and reliability limitations. First, wavelet estimation is a complex process and often subjective. This introduces inaccuracy and bias that adversely impact final results. Secondly, wavelet changes with depth and spatially, which makes it time-consuming and even untrackable in execution of large number of wells. Finally, this step is a bottle neck for end-to-end machine learning that aims at minimal human intervention. To overcome those limitations, the present invention makes use of a new training strategy for neural networks whose execution does not depend on knowing the wavelet.

Figure 1:
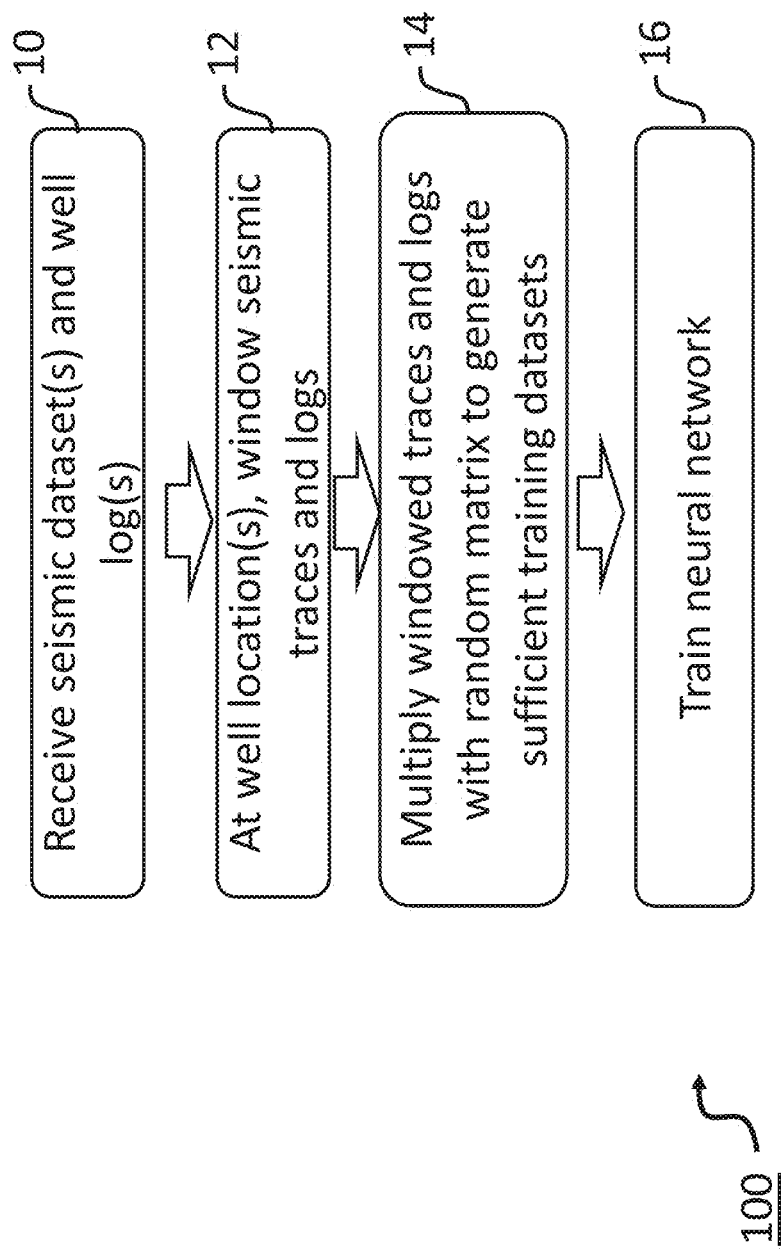
FIG. 1 illustrates a flowchart of a method of rock property estimation, in accordance with some embodiments.

FIG. 1 illustrates a flowchart of a method 100 for training a neural network using seismic data and at least one well log. At operation 10, a seismic dataset and a well log are received. The seismic dataset may be pre-stack seismic data or post-stack seismic data. As previously described, the seismic dataset includes a plurality of traces recorded at a plurality of seismic sensors. This dataset may have already been subjected to a number of seismic processing steps, such as deghosting, multiple removal, spectral shaping, and the like. These examples are not meant to be limiting. Those of skill in the art will appreciate that there are a number of useful seismic processing steps that may be applied to seismic data to enhance the data or reduce noise. The well log may include data from a variety of borehole tools, such as reflectivity, gamma ray, electrical, acoustic, stimulated radioactive responses, electromagnetic, nuclear magnetic resonance, pressure, and the like. In some embodiments, well logs from multiple wells at different locations may be received.

Figure 2:
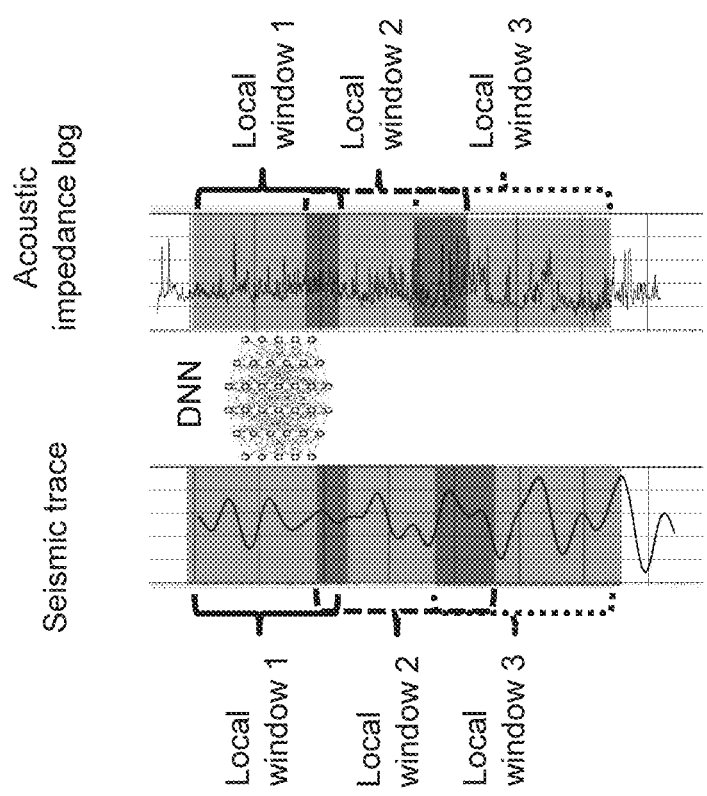
FIG. 2 demonstrates a step of an embodiment.

The well locations of the well logs can be used to identify seismic traces in the seismic dataset that correspond to (i.e., are spatially at or adjacent to) the well bore. At operation 12, the seismic traces that correspond to the well bore and the well logs are windowed along the depth/time axis to produce windowed seismic traces and a windowed well log. The window is devised such that the wavelet in the windowed seismic traces is approximately stationary (i.e., the waveform is consistent in frequency and phase in the window). Those of skill in the art understand that "windowing" means to extract a section of the seismic traces and the well log, in this case along the depth/time axis. In an embodiment, several windows around different points along the depth/time axis may be selected. This is depicted in FIG. 2 where Local Window 1, Local Window 2, and Local Window 3 are indicated for a single seismic trace and a single acoustic impedance log. In this example, the windows overlap but they do not have to overlap.

At operation 14, the windowed seismic traces and windowed well logs are prepared to generate training datasets for machine learning in order to train the neural network at operation 16. Deep Neural Network (DNN) and Deep Convolutional Neural Network (CNN) in particular have opened the door for machine learning to generate huge impact across wide range of disciplines. Image recognition and classification in computer vision and GPU deployment comprises the main driver for the sharply ramped uptake of DNN since around 2012. In those applications, various DNN and CNN architectures allow for automated feature extractions and act as powerful classifier due to its nature of universal approximators (Hornik 1989). The argument is that, if problem can be modeled with functions and enough data points can be provided, then the problem can be solved by DNN. This is indeed the case in computer vision, thanks to the industry wide coordinated efforts to make millions of labeled images available for research. Simply put, labels are the key factor for success applications of DNN.

DNN has been used for some geophysical problems. Some of the successful applications are from automatic seismic interpretation, such as automatic fault extraction, salt segmentation, seismic facies segmentation. With rich labels generated manually or synthetically, recent examples have shown great promise of commercializing those technologies by some of the main vendors. However, another class of problems, i.e., inverse problem in geophysics have achieved limited success. Consider a linear or nonlinear mapping from model space to data space F: X→Y, the inverse problem is concerned with restoring model x by minimizing the difference between observed data y and forward simulation F(x):

$$\arg\min_{x} \|y - F(x)\| \tag{1}$$

In seismic inversion, X and Y are the earth's impedance model r and seismic data d, respectively. The DNN approach seeks an optimal parameter θ of the multi-layer neural network $F^*_\theta$:

$$\arg\min_{\theta} \|r - F^*_\theta(d)\| \tag{2}$$

For a given architecture of $F^*_\theta$, the question boils down to how training datasets $\{r_n, d_n\}$ should be generated to make the learned neural network close approximation to physics. It is common practice that seismic response d can be modeled by convolving reflectivity derived from impedance r with some wavelet w. This approach has been used to generate synthetic data to feed into the training scheme (2). DNN has shown great promise when source wavelet is accurately known (Das, 2018), or in comparison with least-squares solution using the same wavelet (Kim, 2018) in relative sense. At the same time, it is recognized that discrepancy of estimated wavelet frequency and phase with reality will compromise the performance of neural network. It is noted that wavelet estimation from seismic well tie is a non-trivial task, and even more challenging in the presence of spatial/vertical non-stationarity of the wavelet. Therefore, it is desirable to seek a DNN solution to this problem without dependence on wavelet estimation.

An embodiment of the present invention uses a training strategy through data augmentation in deep learning. It is well known that DNN can be overfitted if there are not enough training datasets or labels to feed the training. This poses challenges in some applications when labels are relatively expensive to get. Data augmentation is a way to reduce overfitting on models, where the amount of training data is increased using information only in our training data. One example is cell segmentation in medical imaging. The widely adopted U-Net was first proposed by Ronneberger (2015) for this task. The success was partially attributed to the training strategy that relies on the strong use of data augmentation to use the available annotated samples more effectively. Such a network can be trained end-to-end from very few images and outperforms the prior best method using the data augmentation.

For this embodiment, use column vector d for seismic trace in time or depth domain and column vector r for the earth's reflectivity in the same domain as d. Use matrix W for the wavelet that relate reflectivity to seismic response in a convolution manner (*represents matrix multiplication):

$$d=W*r. \quad (3)$$

In seismic well tie, at the well location, d and r are available from post-stack or pre-stack seismic volume, and derived from sonic/density log, respectively. Matrix W represents the wavelet, which is not directly observed. Matrix notation is used instead of Fourier notation because the convolution is a simpler representation for both stationary and non-stationary wavelets (Zhang and Fomel, 2017). Equation (3), though a simplified model from the real world, is the physics that will be captured in a neural network. A stationary random matrix K whose rows are just time shifted versions of a 1D random kernel is multiplied:

$$K*d=K*W*r. \quad (4)$$

In the case that W is stationary (rows are time shifted versions of a constant wavelet), the multiplication can be commuted:

$$K*d=W*K*r. \quad (5)$$

Therefore, $$\tilde{d}=W*\tilde{r}, \quad (6)$$

where $\tilde{d}=K*d$ and $\tilde{r}=K*r$. As a result, a new training data $\{\tilde{r}, \tilde{d}\}$ is generated using the information from given data $\{r, d\}$ through one realization of K. This procedure can be repeated by sampling K from a given distribution. It is clear from (3) and (6) that augmented training datasets $\{\tilde{r}, \tilde{d}\}$ follow the same physics as the observed/labelled data. What makes this approach attractive is it only needs to convolve the original label $\{r, d\}$ with random kernels, without even asking the question of wavelet W. If the input seismic dataset is pre-stack seismic data, the trace and wavelet change with angle; therefore the procedure is applied for each angle or range of stacked angle. This new training data $\{\tilde{r}, \tilde{d}\}$ which includes thousands of $\{\tilde{r}, \tilde{d}\}$ pairs is used to train a neural network at operation 16. This is also represented by FIG. 3, which shows a single seismic trace (i.e., d) and acoustic impedance log (i.e., r) along with the local windows used to achieve stationarity for the training process of the DNN.

Note that in equation (5), stationarity assumption of W is the key for this strategy to work. In field applications, time-variant wavelets from shallow to deep can result from intrinsic attenuation, scattering, multiples, imaging algorithms or their combinations. Zhang and Fomel (2017) discussed impedance inversion using time-variant wavelet. They proposed a time-variant wavelet extraction based on local spectrum of seismic traces. The present embodiment does not extract a wavelet but rather performs the proposed data augmentation in local windows. As such, stationarity assumption can be approximately satisfied. The window can be moved for all depths in order to process the entire seismic trace and well log. Prediction away from the wells relies on small spatial variation of the wavelet.

Secondly, prior distribution of reflectivity model can be accommodated by this method. From statistical learning point of view, neural networks are trained to generate results with the desired distribution inherited from the training data sets. For this reason, DNN has been particularly useful for generative modeling, thanks to the latest development of various networks such as Generative Adversary Network and Variational Autoencoder. Assume $\tilde{r}$ is a reflectivity instance sampled from some prior distribution $\mathcal{H}$ (e.g. from geological hypothesis), the filter K can be derived such that:

$$K*r=\tilde{r} \quad (7)$$

Then the same filter K will be used in (5) to generate augmented training set $\{\tilde{r}, \tilde{d}\}$.

This method is different from the method of Generalized Regression Neural Network (GRNN) for seismic inversion (Keynejad et al. 2017, Hampson 2001). The GRNN method uses multi-attributes derived from seismic as input for a regression neural network. It does not require a knowledge of the seismic wavelet. However, a set of attributes need to be investigated and selected by a user to get started. Indeed, the process of generating multi-attributes from seismic traces at well locations is in the same spirit as data augmentation. And our random kernel approach can be considered as an automated attributes generation to feed into DNN.

Figure 3A:
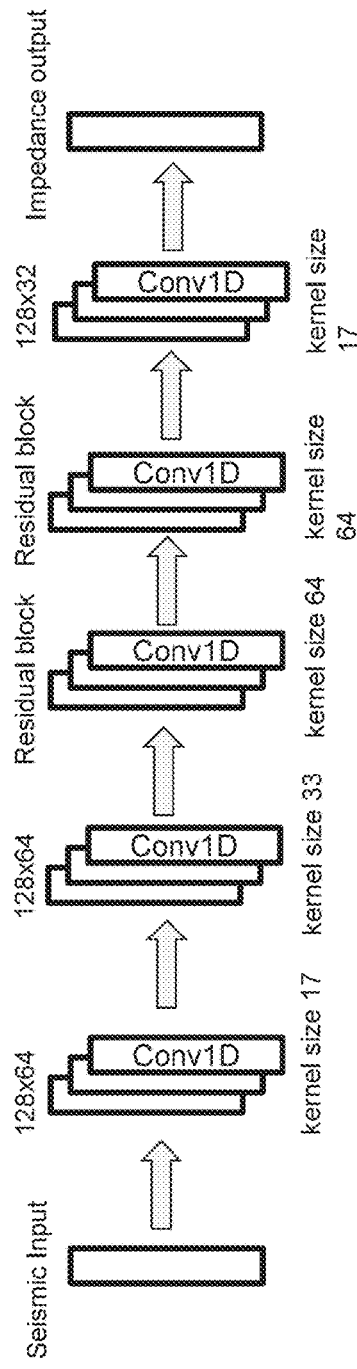
FIG. 3A demonstrates a network architecture for a particular embodiment.

In this embodiment, a CNN architecture is designed similar to that used by Xu et al. (2014) for imaging deblurring. Note that it is hard to argue the best deep learning architecture for a given problem. However, the embodiments described herein use DNN and CNN over FCN (Fully-Connected Net) based on the physics of the problem, which is deconvolution by nature and translation invariant. An example of the CNN architecture is shown in FIG. 3A, where the input is seismic data, the output is impedance, and the CNN includes 5 layers. This is not meant to be limiting; one of skill in the art will appreciate that many variations of deep learning architecture may be used.

After the neural network has been trained, the trained neural network is used to estimate rock properties from a seismic dataset. In an embodiment, the input to the network is a seismic trace and the output is predicted impedance profile. In an embodiment, we used 6000 training pairs of impedance and seismic trace $\{\tilde{I}, \tilde{d}\}$ from data augmentation and iterate 500 epochs. Despite the input being impedance, we need to convert it to reflectivity $\tilde{r}$ to generate augmented data. Therefore, the DC component of impedance profile is not learned and must be given by the original well log.

To further reduce over-fitting on the model, we used regularization term in the loss function to penalize infeasible solutions. The final optimization problem we are solving is the following:

$$\arg\min_{\theta} \|I - F_{\theta}^*(d)\|_{L2} + \lambda \|\nabla I\|_{L1}, \quad (8)$$

where I is impedance and $\lambda$ is a weighting factor that may vary with S/N of the data.

In another embodiment, rather than using the trained neural network from operation 16 to estimate rock properties from seismic data, it can be used to estimate a wavelet from a well log. The wavelet is a property of seismic data. In this embodiment, the neural network is trained by using the training pairs in a reversed order, that is reflectivity log as input and seismic trace as output. The trained neural network takes at least one well log as input and generates at least one seismic trace that includes the wavelet. In particular, an input of reflectivity pulse function to the trained network will output the estimated wavelet as shown in FIG. 3C.

Figure 3B:
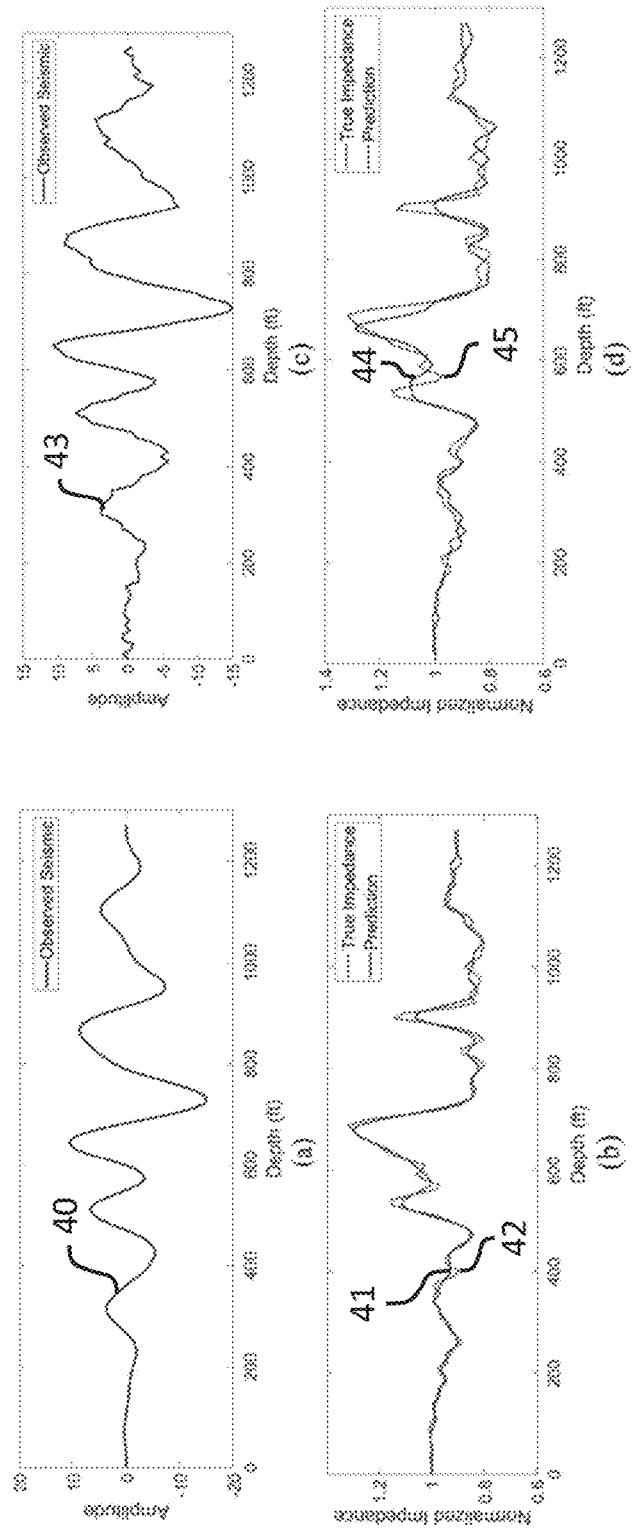
FIG. 3B demonstrates steps and a result for a particular embodiment.

An embodiment of the training strategy and CNN model are applied to a synthetic 1-D dataset as shown in FIG. 3B. To avoid time-depth conversion, this example is performed in the depth domain and constant velocity is assumed when this conversion is needed in the background. A Ricker wavelet with "dominant wavelength" (converted from peak frequency) of 212 ft is convolved with the synthetic reflectivity model to generate observed seismic traces. Since the synthetic reflectivity model is known, the true impedance model is also known. In this example, both the seismic and impedance log are sampled at 10 ft spacing. Following the steps of method 100, the one pair of impedance and seismic traces were used to generate 6000 augmented training pairs. The neural network reached convergence after 500 epochs. Then the trained CNN model was used on an impedance-seismic pair (seismic is generated by the same Ricker wavelet) which the network has never seen during the training. In FIG. 3B, panel (a) shows the observed seismic trace 40 that is used as input to the trained CNN. Panel (b) shows the true impedance 42 and the prediction 41 that was output from the CNN. To test the CNN further, 10% random noise was added to the observed seismic as shown by the noisy observed seismic 43 in panel (c). The result from the same CNN is still good as shown in panel (d) where the true impedance is 45 and the prediction is 44.

Two observations can be made on this test. First, without having a knowledge of the wavelet, the trained neural network accurately restored impedance layer as thin as 53 ft (¼ dominant wavelength of the wavelet). Secondly, when the model is trained and tested with noise added, it is reasonably robust, but may lead to slight mis-positioning of the peak values.

The present invention may significantly speed up seismic processing when large numbers of wells are considered together with seismic data to delineate complex geology. This is particularly important for well management in unconventional resources.

Figure 4:
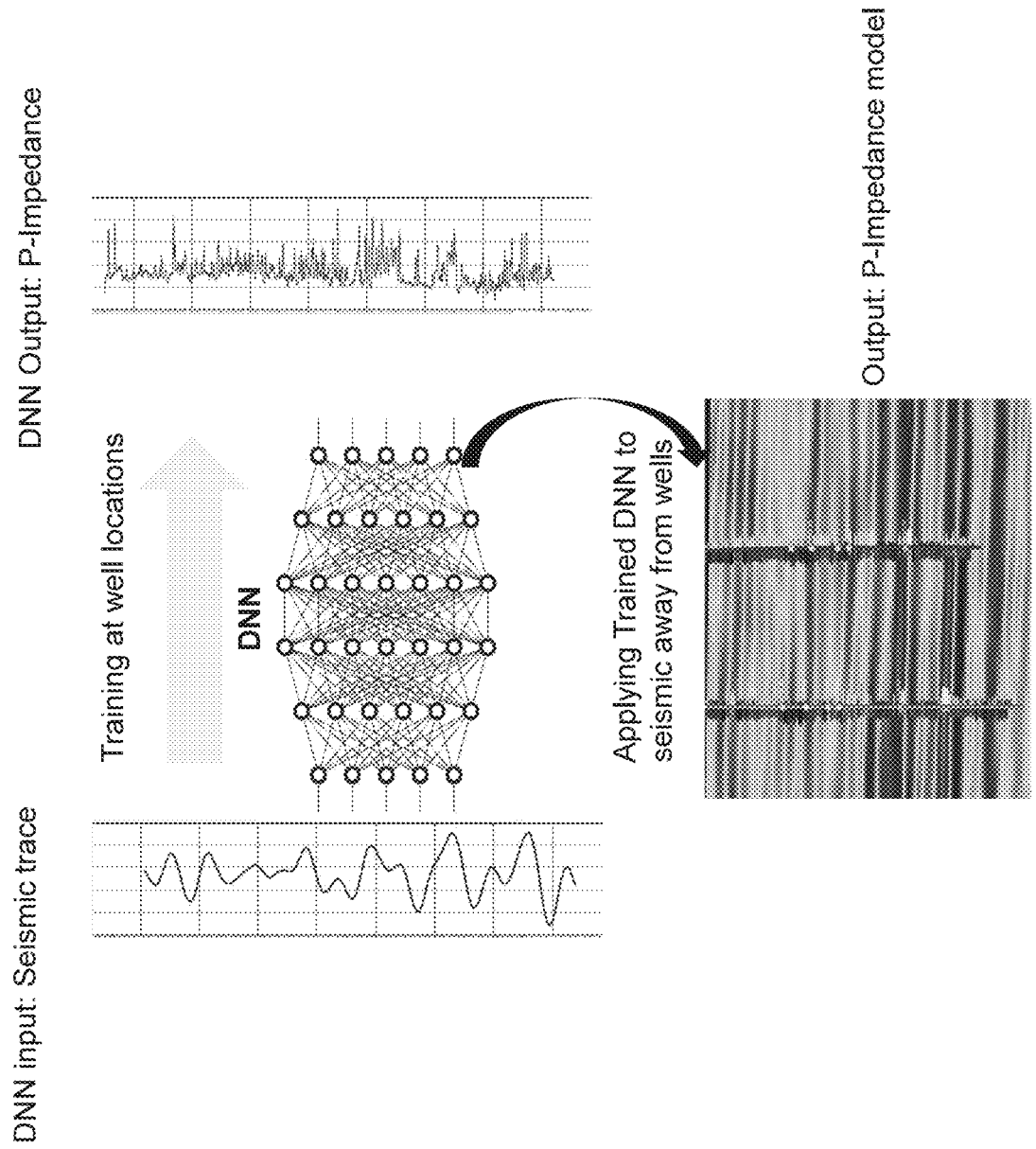
FIG. 4 demonstrates steps and a result of an embodiment.

The method herein describes a true end-to-end deep neural network for seismic inversion. Once properly trained, it predicts impedance profile directly from seismic input. The method includes a training strategy that removed the dependence on the knowledge of wavelet. This method has the potential to greatly reduce the turnaround time for seismic inversion. A summary of the method is graphically illustrated in FIG. 4. Training the DNN or CNN is done at well locations where well logs and seismic traces exist, using the data augmentation method described above. The trained DNN then takes input seismic data away from the wells to generate output impedance models away from the wells.

Figure 5:
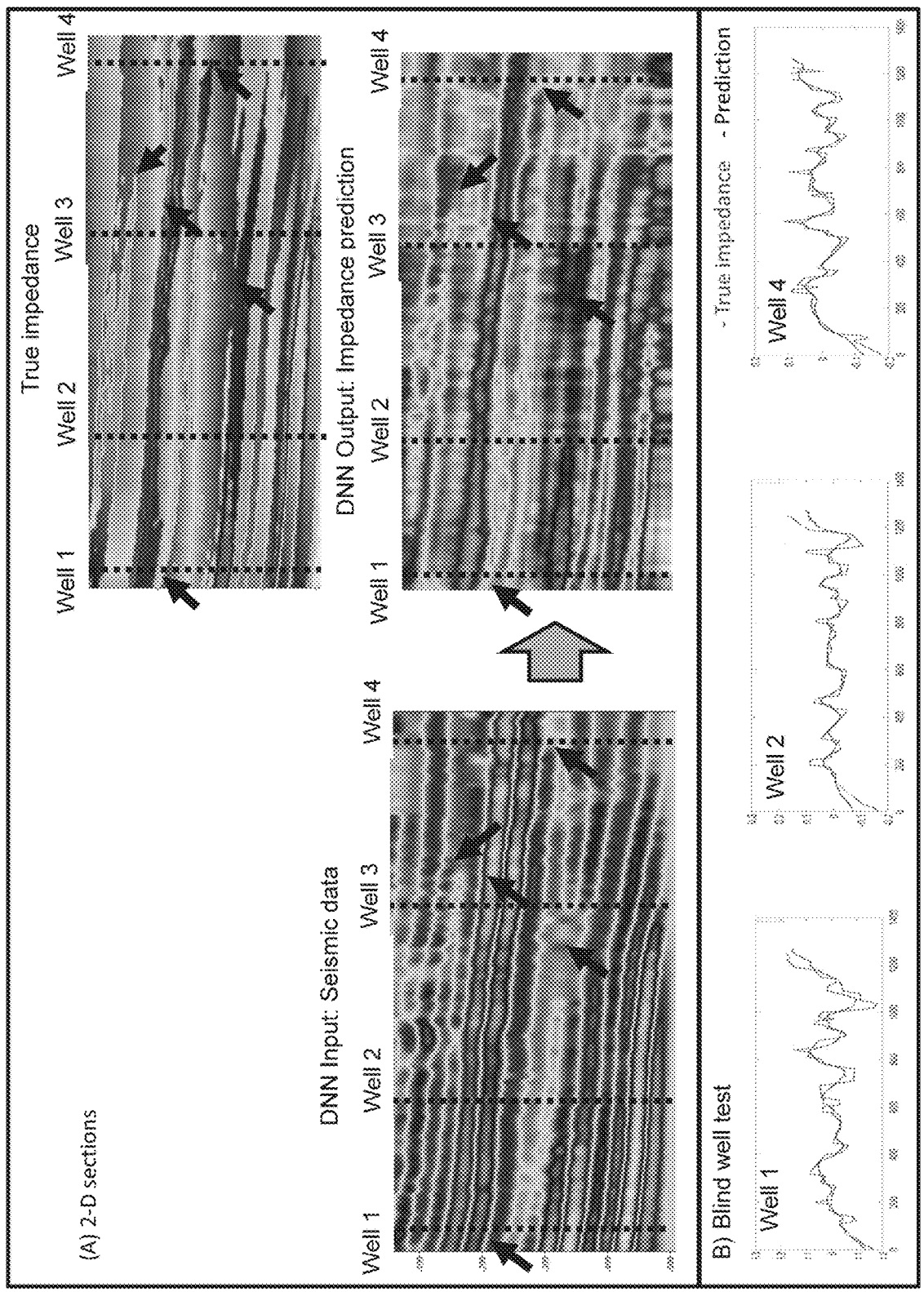
FIG. 5 demonstrates results of an embodiment.

FIG. 5 is another example of results from method 100. In panel (A), 2-D sections of the input seismic data, output impedance section, and true impedance are shown. each section has four wells (Well 1, Well 2, Well 3, and Well 4) indicated by dotted lines. Each section has 5 black arrows indicating areas of interest for this example. The impedance prediction has an overall result very similar to the true impedance and at the points indicated by the arrows it is clear that the method has done a very good job going from the seismic data to the impedance prediction. This can also be confirmed in panel (B) which shows the results of blind well tests. In this case, seismic data located at and well logs from Well 1, Well 2, Well 3, and Well 4 were not used in the training of the DNN. The three graphs in panel (B) show a 1-D comparison of the true impedance (gray curves) with the prediction (black curves) at Well 1, Well 2 and Well 4.

The estimated rock properties from operation 18 may be used to interpret features in the subsurface and may also be used to perform seismic imaging where the imaging uses the rock properties (e.g., compressional slowness, shear slowness, and/or density) to generate a seismic image. The seismic image may also be used to interpret features in the subsurface including, by way of example and not limitation, particular rock formations, salt bodies, faults, and hydrocarbon reservoirs. This may impact hydrocarbon reservoir delineation and well planning.

Figure 6:
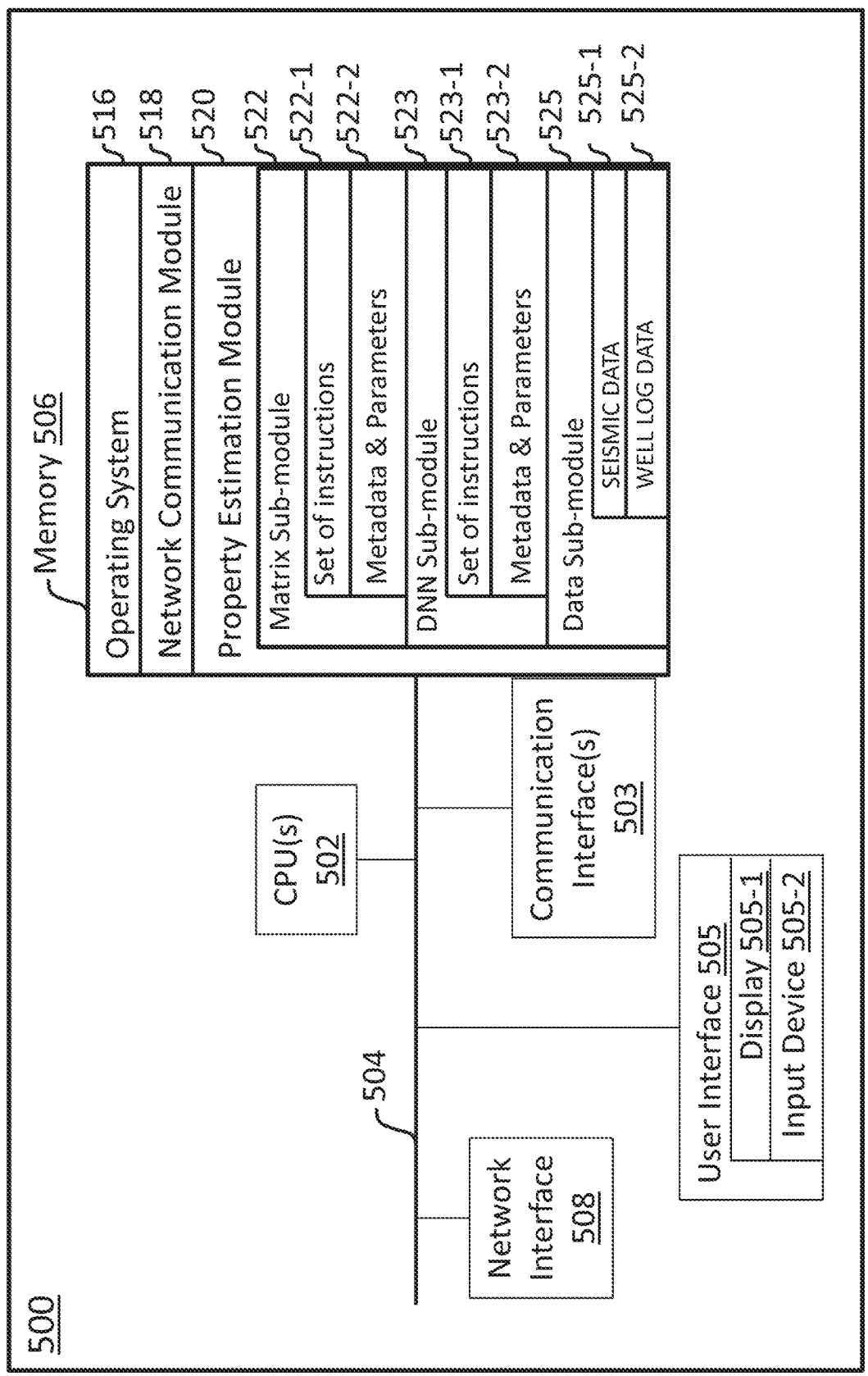
FIG. 6 is a block diagram illustrating a rock property estimation system, in accordance with some embodiments.

FIG. 6 is a block diagram illustrating a property estimation system 500, in accordance with some embodiments. While certain specific features are illustrated, those skilled in the art will appreciate from the present disclosure that various other features have not been illustrated for the sake of brevity and so as not to obscure more pertinent aspects of the embodiments disclosed herein.

To that end, the property estimation system 500 includes one or more processing units (CPUs) 502, one or more network interfaces 508 and/or other communications interfaces 503, memory 506, and one or more communication buses 504 for interconnecting these and various other components. The rock property estimation system 500 also includes a user interface 505 (e.g., a display 505-1 and an input device 505-2). The communication buses 504 may include circuitry (sometimes called a chipset) that interconnects and controls communications between system components. Memory 506 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 506 may optionally include one or more storage devices remotely located from the CPUs 502. Memory 506, including the non-volatile and volatile memory devices within memory 506, comprises a non-transitory computer readable storage medium and may store seismic data, velocity models, seismic images, and/or geologic structure information.

In some embodiments, memory 506 or the non-transitory computer readable storage medium of memory 506 stores the following programs, modules and data structures, or a subset thereof including an operating system 516, a network communication module 518, and a property estimation module 520.

The operating system 516 includes procedures for handling various basic system services and for performing hardware dependent tasks.

The network communication module 518 facilitates communication with other devices via the communication network interfaces 508 (wired or wireless) and one or more communication networks, such as the Internet, other wide area networks, local area networks, metropolitan area networks, and so on.

In some embodiments, the property estimation module 520 executes the operations of method 100. Property estimation module 520 may include data sub-module 525, which handles the seismic dataset including seismic data 525-1 and well logs 525-2. This data is supplied by data sub-module 525 to other sub-modules.

Matrix sub-module 522 contains a set of instructions 522-1 and accepts metadata and parameters 522-2 that will enable it to execute, for example, operations 10, 12, and 14 of method 100. The DNN function sub-module 523 contains a set of instructions 523-1 and accepts metadata and parameters 523-2 that will enable it to execute, for example, operations 16 and 18 of method 100. Although specific operations have been identified for the sub-modules discussed herein, this is not meant to be limiting. Each sub-module may be configured to execute operations identified as being a part of other sub-modules, and may contain other instructions, metadata, and parameters that allow it to execute other operations of use in processing seismic data, estimating rock properties, and generating the seismic image. For example, any of the sub-modules may optionally be able to generate a display that would be sent to and shown on the user interface display 505-1. In addition, any of the seismic data or processed seismic data products may be transmitted via the communication interface(s) 503 or the network interface 508 and may be stored in memory 506.

Method 100 is, optionally, governed by instructions that are stored in computer memory or a non-transitory computer readable storage medium (e.g., memory 506 in FIG. 6) and are executed by one or more processors (e.g., processors 502) of one or more computer systems. The computer readable storage medium may include a magnetic or optical disk storage device, solid state storage devices such as flash memory, or other non-volatile memory device or devices. The computer readable instructions stored on the computer readable storage medium may include one or more of: source code, assembly language code, object code, or another instruction format that is interpreted by one or more processors. In various embodiments, some operations in each method may be combined and/or the order of some operations may be changed from the order shown in the figures. For ease of explanation, method 100 is described as being performed by a computer system, although in some embodiments, various operations of method 100 are distributed across separate computer systems.

While particular embodiments are described above, it will be understood it is not intended to limit the invention to these particular embodiments. On the contrary, the invention includes alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the embodiments.

The terminology used in the description of the invention herein is for the purpose of describing particular embodiments only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, operations, elements, and/or components, but do not preclude the presence or addition of one or more other features, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

Although some of the various drawings illustrate a number of logical stages in a particular order, stages that are not order dependent may be reordered and other stages may be combined or broken out. While some reordering or other groupings are specifically mentioned, others will be obvious to those of ordinary skill in the art and so do not present an exhaustive list of alternatives. Moreover, it should be recognized that the stages could be implemented in hardware, firmware, software or any combination thereof.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

REFERENCES

K. Hornik, M. Stinchcombe, and H. White. Multilayer feedforward networks are universal approximators. Neural networks, 2(5):359-366, 1989.

Kim, Y., and Nakata, N., 2018, Geophysical inversion versus machine learning in inverse problems, Yuji Kim and Nori Nakata, Leading Edge, 37, No. 12, Das, V., Bollack, A., Wollner U., and Mukerji, T., Convolutional neural network for seismic impedance inversion, 2018, SEG Extended Abstract Ronneberger, O, fischer, P. and Brox T., 2015, U-Net: Convolutional Networks for Biomedical Image Segmentation, MICCAI 2015

Zhang, R. and Fomel S., 2017, Time-variant wavelet extraction with a local-attribute-based time-frequency decomposition for seismic inversion, Interpretation (5), 1, p SC9-SC16

Keynejad, S., Sbar, M. and Johnson R., 2017, Comparison of model-based generalized regression neural network and prestack inversion in predicting Poisson's ratio in Heidrun Field, North Sea, the Leading Edge, 36, No. 11

Hampson, D., Schuelke, J. and Quirein J., 2001, Use of multiattribute transforms to predict log properties from seismic data: Geophysics 66, no. 1, 220-236

Xu, L., Ren, J., Liu, C., and Jia, J., 2014, Deep Convolutional Neural Network for Image Deconvolution.

What is claimed is:

1. A computer-implemented method, comprising:
   a. receiving, at a computer processor, a seismic dataset representative of a subsurface volume of interest and a well log r from a well location within the subsurface volume of interest;
   b. identifying seismic traces in the seismic dataset that correspond to the well location to obtain a subset of seismic traces d;
   c. windowing the subset of seismic traces and the well log to generate windowed seismic traces and a windowed well log;
   d. multiplying the windowed seismic traces and the windowed well log by a random matrix to generate a plurality of training datasets $\{\tilde{r}, \tilde{d}\}$; and
   e. training a neural network using the plurality of training datasets $\{\tilde{r}, \tilde{d}\}$, wherein the neural network may be trained using $\tilde{d}$ as input to generate rock properties as output or using $\tilde{r}$ as input to generate a seismic wavelet as output.

2. The method of claim 1 further comprising using the trained neural network to estimate rock properties from another seismic dataset.

3. The method of claim 2 further comprising using the rock properties for seismic imaging and interpretation.

4. The method of claim 1 wherein the well log is a reflectivity log.

5. The method of claim 1 further comprising using the trained neural network to estimate a wavelet from another well log.

6. A computer system, comprising:
   one or more processors;
   memory; and
   one or more programs, wherein the one or more programs are stored in the memory and configured to be executed by the one or more processors, the one or more programs including instructions that when executed by the one or more processors cause the system to execute:
   a. receiving, at the one or more processors, a seismic dataset representative of a subsurface volume of interest and a well log r from a well location within the subsurface volume of interest;
   b. identifying seismic traces in the seismic dataset that correspond to the well location to obtain a subset of seismic traces d;
   c. windowing the subset of seismic traces and the well log to generate windowed seismic traces and a windowed well log;
   d. multiplying the windowed seismic traces and the windowed well log by a random matrix to generate a plurality of training datasets $\{\tilde{r}, \tilde{d}\}$; and
   e. training a neural network using the plurality of training datasets $\{\tilde{r}, \tilde{d}\}$, wherein the neural network may be trained using $\tilde{d}$ as input to generate rock properties as output or using $\tilde{r}$ as input to generate a seismic wavelet as output.

7. The computer system of claim 6 further comprising using the trained neural network to estimate rock properties from another seismic dataset.

8. The computer system of claim 7 further comprising using the rock properties for seismic imaging and interpretation.

9. The computer system of claim 6 wherein the well log is a reflectivity log.

10. The computer system of claim 6 further comprising using the trained neural network to estimate a wavelet from another well log.

11. A non-transitory computer readable storage medium storing one or more programs, the one or more programs comprising instructions, which when executed by an electronic device with one or more processors and memory, cause the device to execute:
    a. receiving, at the one or more processors, a seismic dataset representative of a subsurface volume of interest and a well log r from a well location within the subsurface volume of interest;
    b. identifying seismic traces in the seismic dataset that correspond to the well location to obtain a subset of seismic traces d;
    c. windowing the subset of seismic traces and the well log to generate windowed seismic traces and a windowed well log;
    d. multiplying the windowed seismic traces and the windowed well log by a random matrix to generate a plurality of training datasets $\{\tilde{r}, \tilde{d}\}$; and
    e. training a neural network using the plurality of training datasets $\{\tilde{r}, \tilde{d}\}$, wherein the neural network may be trained using $\tilde{d}$ as input to generate rock properties as output or using $\tilde{r}$ as input to generate a seismic wavelet as output.

\* \* \* \* \*